United States Patent
Marko et al.

(10) Patent No.: US 6,564,003 B2
(45) Date of Patent: May 13, 2003

(54) METHOD AND APPARATUS FOR COMPOSITE DATA STREAM STORAGE AND PLAYBACK

(75) Inventors: Paul D. Marko, Pembroke Pines, FL (US); Craig P. Wadin, Sunrise, FL (US)

(73) Assignee: XM Satellite Radio Inc., Washington, DC (US)

( * ) Notice: Subject to any disclaimer, the term of this patent is extended or adjusted under 35 U.S.C. 154(b) by 0 days.

(21) Appl. No.: 09/433,862

(22) Filed: Nov. 4, 1999

(65) Prior Publication Data

US 2002/0071658 A1 Jun. 13, 2002

(51) Int. Cl.⁷ .................. H04N 5/783; H04N 5/781
(52) U.S. Cl. ........................... 386/69; 386/125
(58) Field of Search .................. 386/1, 45, 46, 386/95, 69–70, 98, 125, 126; 348/460, 461; 725/105, 114, 115, 131, 133, 135, 136, 141, 143, 144, 145, 151, 153, 87, 91, 92, 100, 101; 705/26, 27; 345/205; H04N 5/76, 5/783, 5/781, 5/92, 9/79

(56) References Cited

U.S. PATENT DOCUMENTS

| | | | |
|---|---|---|---|
| 4,881,241 A | * 11/1989 | Pommier et al. | 375/38 |
| 5,191,576 A | * 3/1993 | Pommier et al. | 370/18 |
| 5,197,061 A | * 3/1993 | Halbert-Lassalle et al. | 370/11 |
| 5,228,025 A | * 7/1993 | Le Floch et al. | 370/20 |
| 5,278,863 A | * 1/1994 | Briskman | 375/1 |
| 5,283,780 A | * 2/1994 | Schuchman et al. | 370/50 |
| 5,305,353 A | * 4/1994 | Weerackody | 375/100 |
| 5,319,673 A | * 6/1994 | Briskman | 375/1 |
| 5,485,485 A | * 1/1996 | Briskman et al. | 375/200 |
| 5,508,733 A | * 4/1996 | Kassatly | 725/131 |
| 5,592,471 A | * 1/1997 | Briskman | 375/200 |
| 5,613,032 A | * 3/1997 | Cruz et al. | 386/69 |
| 5,615,342 A | * 3/1997 | Johnson | 705/27 |
| 5,720,039 A | * 2/1998 | Lieberman | 375/285 |
| 5,745,839 A | * 4/1998 | Lieberman | 375/285 |
| 5,794,138 A | * 8/1998 | Briskman | 369/2 |
| 5,847,971 A | * 12/1998 | Ladner et al. | 703/1 |
| 5,848,103 A | * 12/1998 | Weerackody | 375/295 |
| 5,850,500 A | * 12/1998 | Hirayama et al. | 386/125 |
| 5,864,579 A | * 1/1999 | Briskman | 375/200 |
| 5,977,962 A | * 11/1999 | Chappman et al. | 345/327 |
| 6,128,650 A | * 10/2000 | De Vos et al. | 725/93 |
| 6,243,713 B1 | * 6/2001 | Nelson et al. | 707/104 |

* cited by examiner

*Primary Examiner*—Thai Tran
(74) *Attorney, Agent, or Firm*—Roylance, Abrams, Berdo & Goodman, L.L.P.

(57) ABSTRACT

A composite data stream is stored on a data storage medium. The composite data stream comprises a plurality of program channels to provide services such as satellite digital audio radio service (SDARS), among others. The program channels are multiplexed into the composite data stream, which also comprises control data for indicating where services are located in the composite data stream. A playback device is configured to access the composite data stream on the data storage medium, to demultiplex at least the program channels and to retrieve selected services from the data storage medium in response to user inputs by using the control data.

7 Claims, 6 Drawing Sheets

METHOD AND APPARATUS FOR COMPOSITE DATA STREAM STORAGE AND PLAYBACK

CROSS-REFERENCE TO RELATED APPLICATIONS

Related subject matter is disclosed and claimed in co-pending U.S. patent application Ser. No. 09/435,315, filed by Paul Marko et al on Nov. 4, 1999; in co-pending U.S. patent application Ser. No. 09/318,938, filed by Paul D. Marko et al on May 26, 1999; and in co-pending U.S. patent application Ser. No. 09/433,861, filed by Paul D. Marko on even date herewith; all of said applications being expressly incorporated herein by reference.

FIELD OF THE INVENTION

This invention relates to an apparatus and method for digitally recording and playing back a composite data stream. More particularly, the invention relates to digitally recording a composite data stream containing a plurality of multiplexed channels onto a recording media, retrieving the recording from the medium, and selecting one of the channels and outputting the selected channel.

BACKGROUND OF THE INVENTION

Satellite digital audio radio service (SDARS), a satellite broadcast service established by the U.S. Federal Communications Commission (FCC), has been proposed using satellite transmission of digital audio programs to radio receivers. The radio receivers can be stationary receivers, in which case a receiver antenna can be pointed for optimal line of sight (LOS) reception from a satellite. In contrast, the position of the receiver antenna relative to the satellite changes with mobile receivers (e.g., a receiver that is hand-carried by a user or is mounted in a vehicle), and LOS reception from one satellite is not always available. Accordingly, mobile receivers are generally configured to receive broadcast signals from more than one satellite.

Service outages can occur in proposed systems which broadcast data, video, audio and other information using radio frequencies. These outages can prevent receivers, and particularly mobile receivers, from receiving the broadcast service altogether, or cause them to receive a signal so degraded that the service is rendered unacceptable. These outages are generally due to physical blockage of transmission paths between the transmitter and receiver (e.g., due to mountainous terrain or long tunnels) and multipath fading and reflection of the transmission path. Satellite broadcast systems can therefore use two transmission channels to provide diversity for mitigating service outages due to multipath, physical blockages and interference in mobile broadcast receivers. Terrestrial repeaters can also be provided to repeat satellite signals in geographic areas where LOS reception is obscured by tall buildings, hills and other obstructions.

Nevertheless, for some users, adequate satellite or terrestrial broadcast coverage may not be available (e.g., users traveling by airplane or residing in apartment buildings). On the other hand, some users may desire SDARS broadcast programming, and be in an area having coverage from at least one of a satellite or terrestrial repeater, but may not wish to purchase a radio receiver or a service that includes ongoing reception of broadcast signals. For example, a retail store may wish to have several hours of music programs intended for satellite broadcast but stored on a storage medium for continuous and repeated playback in the store. The owner/operator of the retail store may not perceive the need for receiving additional broadcast data when a stored composite data stream, which can have plural channels comprising several hours of music, for example, satisfies the desire to provide customers with background music. A need therefore exists for storage of composite data streams (e.g., programs intended for satellite broadcast) on a memory device that can be played back on a playback device, whereby the playback device need not be equipped to receive radio frequency broadcast signals.

A number of methods exist for digitally recording information onto a recording medium, and retrieving or otherwise playing back the recorded information using, for example, a compact disc (CD) or a digital video disc (DVD). The recording techniques used with these types of recording media, however, only record a single information channel. The information channel can contain a number of content segments such as songs on a music CD, for example, or a film and related information such as the soundtrack for the film and director/actor interviews about the making of the film. The content segments of the information channel are demarcated on the recording media during the recording process.

These playback devices (e.g., CD or DVD players), however, are not equipped to retrieve information from a composite data stream stored on recording media. As will be described in more detail below, a composite data stream such as an SDARS signal comprises multiplexed program channels. Each of the program channels can comprise multiple service components. The number of frames of multiplexed channels required to transmit or playback the different program channels can vary. Accordingly, headers having information for demultiplexing and decoding the multiplexed program channels and service components therein are provided. Conventional playback devices such as CD and DVD players are not configured to decode such header information in a composite data stream to locate program channels selected by a user for playback, but rather simply rely on content segment demarcation information provided on the recording media at the time of recording. A need therefore exists for an apparatus for and method of recording a composite data stream and retrieving selected content therefrom for playback.

SUMMARY OF THE INVENTION

Accordingly, an aspect of the present invention is to provide an apparatus, system and method for increasing the diversity of information that can be recorded on and retrieved from a recording medium.

Another aspect of the present invention is to provide an apparatus, system and method for recording a composite data stream on a storage medium and playing back selected content in the recorded composite data stream.

In accordance with another aspect of the present invention, an apparatus, system and method are provided for recording a composite data stream representing a plurality of broadcast channels in a time division multiplex format for later playback and simulation of a digital audio or video program received from a satellite broadcast.

In accordance with yet another aspect of the present invention, an apparatus for storing a composite signal includes a number of encoders which encode both analog and digital content to create service components. The apparatus generates payload channels having plural service components. A multiplexed composite data stream is then created which comprises at least a portion of the payload channels and header information to identify where in the composite data stream the portions of each payload channel therein reside. The composite signal is sent to a recorder for recording a selected duration of the data stream onto a memory storage device or recording medium.

In accordance with still yet another aspect of the invention, the storage medium containing a recorded composite digital signal is played, emulating a broadcast signal carrying at least two channels of information. During playback, the played composite signal is demultiplexed and the service components of a selected channel can be decoded. Playback of the composite signal can also involve additional decoding if an outer layer of decoding is used with the composite data stream, as well as deinterleaving and/or forward error correcting (FEC) when interleaving and/or FEC techniques are also used. The demultiplexed signals are provided to a source or service layer decoder for further processing to extract a user-selected channel for output.

In this manner, a composite data stream that is generated to carry a plurality of SDARS program channels can be recorded onto a disc or other recording medium for playback at another time without having to be broadcast and received at a receiver. A user can insert the recorded medium into a player, such as a portable radio/cassette/CD portable stereo unit equipped with suitable playback electronics, and play the recorded medium as if it had received an SDARS broadcast. The user selects a program channel or content segment in a program channel for retrieval and playback in a manner similar to the selection of a program content from a received signal using a satellite reciever. The playback electronics decode and output selected content from the composite data stream on the storage media using the header information for digital-to-analog conversion and output to speakers, for example, for display on a display device, or annunication via other output devices.

BRIEF DESCRIPTION OF THE DRAWINGS

The various aspects, advantages and novel features of the present invention will be more readily comprehended from the following detailed description when read in conjunction with the appended drawings, in which.

Throughout the drawing figures, like reference numerals will be understood to refer to like parts and components.

DETAILED DESCRIPTION OF THE PREFERRED EMBODIMENTS

Figure 1:
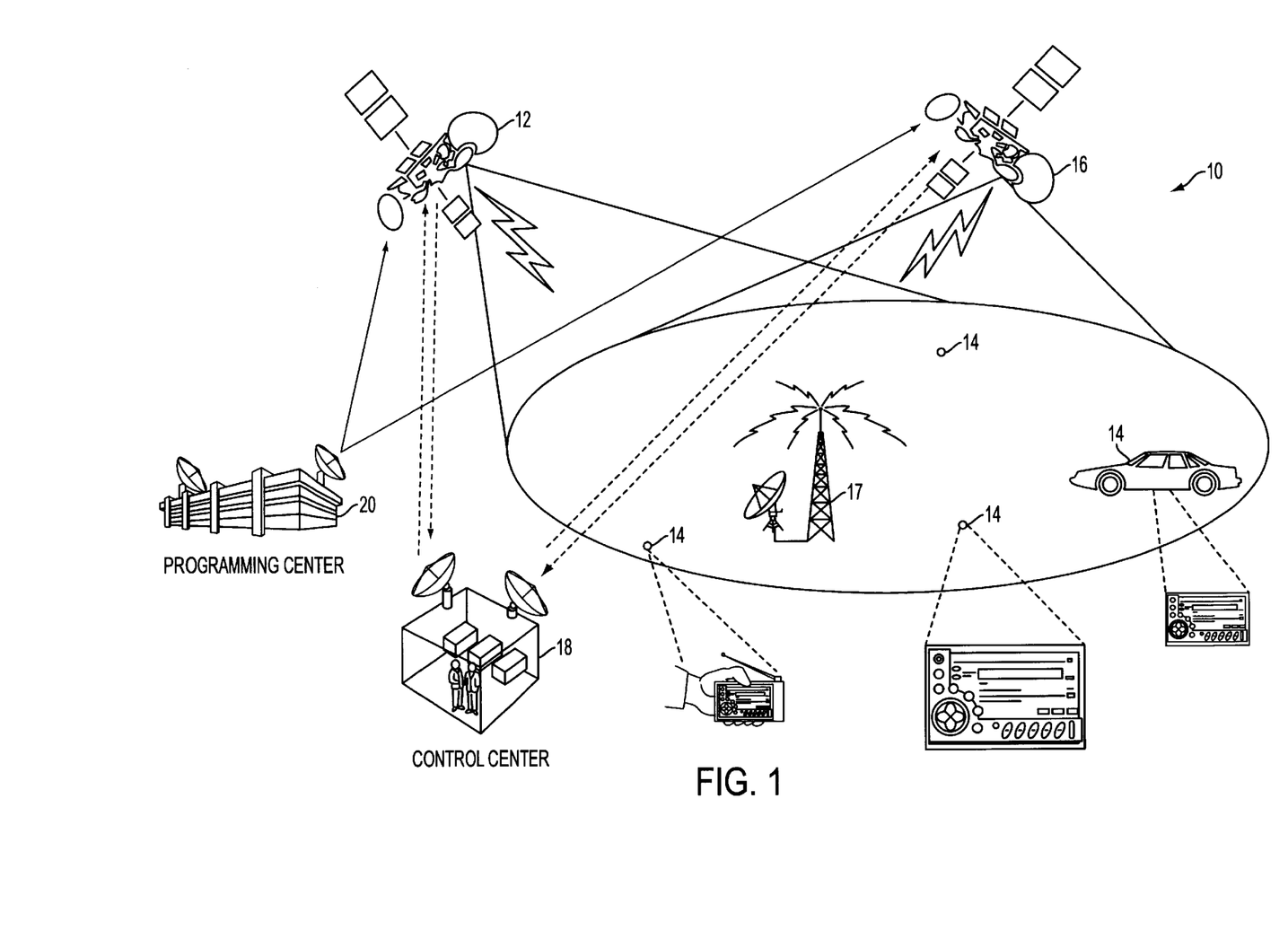
FIG. 1 illustrates an SDARS system constructed in accordance with an embodiment of the present invention.

FIG. 1 depicts a satellite broadcast system 10 which comprises at least one geostationary satellite 12, for example, for line of sight (LOS) satellite signal reception at receiver units indicated generally at 14. The satellite broadcast system 10 can be used for SDARS, for example. Another geostationary satellite 16 at a different orbital position is provided for diversity purposes. One or more terrestrial repeaters 17 can be provided to repeat satellite signals from one of the satellites in geographic areas where LOS reception is obscured by tall buildings, hills and other obstructions. It is to be understood that different numbers of satellites can be used, and that satellites in other types of orbits can be used.

As illustrated in FIG. 1, a receiver unit 14 can be configured for stationary use (e.g., on a subscriber's premises), or mobile use (e.g., portable use or mobile use in a vehicle), or both. A control center 18 is provided for telemetry, tracking and control of the satellites 12 and 16. A programming center 20 is provided to generate and transmit a composite data stream via the satellites 12 and 16 which comprises a plurality of payload channels, as will now be described with reference to FIGS. 2 through 5.

Figure 2:
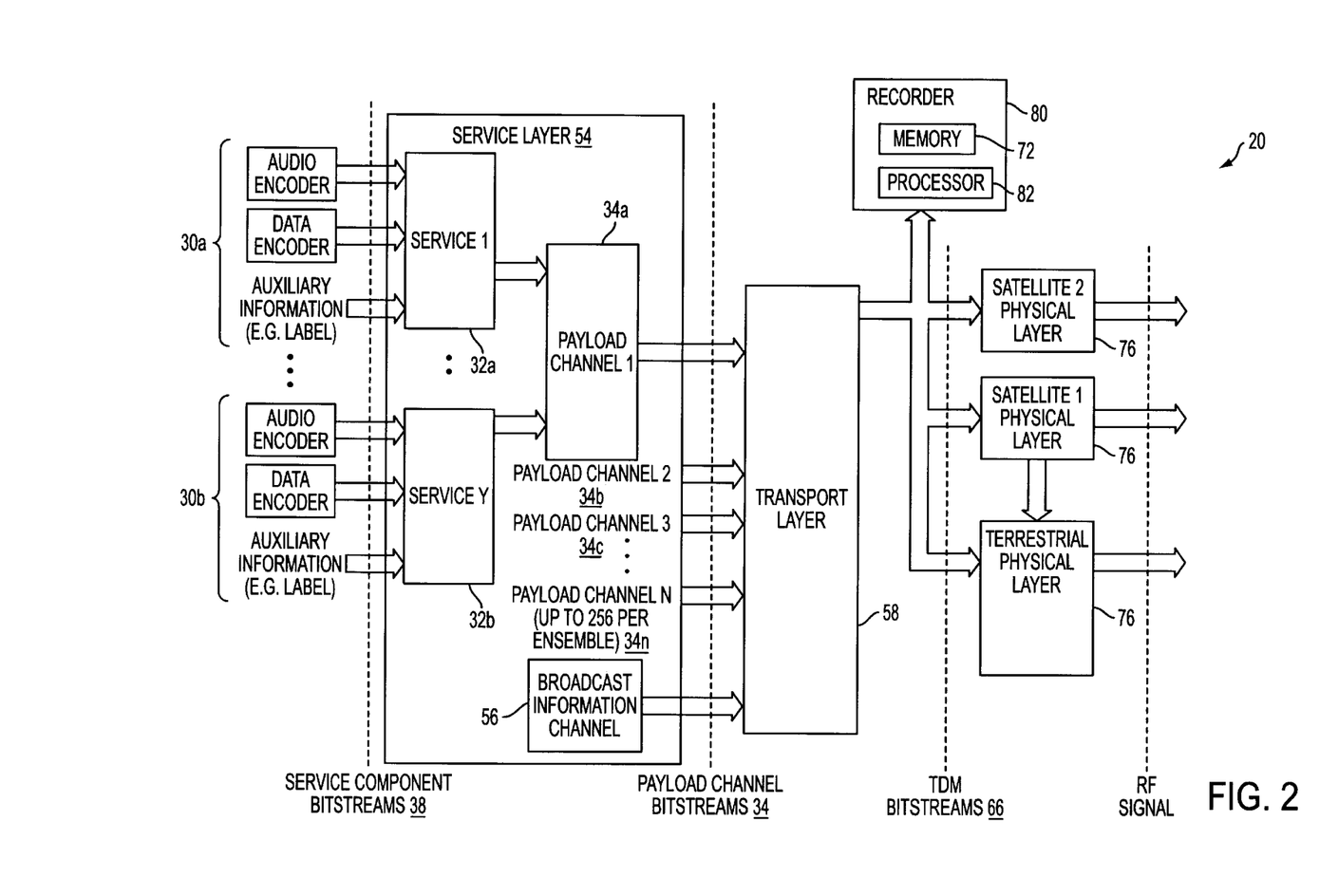
FIG. 2 is a block diagram depicting the conversion of input information into a composite data stream for recording onto a storage medium in accordance with an embodiment of the present invention.

With reference to FIG. 2, the programming center 20 is configured to obtain content from different information sources and providers and to provide the content to corresponding encoders, as indicated at 30a and 30b. The content can comprise both analog and digital information such as audio, video, data, program label information, auxiliary information, and so on. For example, the programming center 20 can provide SDARS having on the order of 100 different program channels to transmit different types of music programs (e.g., jazz, classical, rock, religious, country, and so on) and news programs (e.g., regional, national, political, financial, sports). The SDARS can also provide emergency information, travel advisory information, educational programs, and the like.

With continued reference to FIG. 2, the types of content to be provided in a payload channel is determined manually, or automatically via a computer, based on contractual and financial arrangements with information providers, and demographic and financial decisions determining the types of programming to be provided via the programming center 20. In addition, a payload channel can comprise plural service components to provide a plurality of different services, as indicated at 32a and 32b. Further, a number of service components in a payload channel can be related to the same service. For example, service components related to the same service can include an audio component, a video component, and a digital data stream comprising auxiliary information or another audio channel to insert advertising information relating to the audio and video program. The programming center is operable to allocate bandwidth for services 32 to different payload channels 34a, 34b, . . . , 34n which are configured to transmit the content. As will be described below, the programming center is also operable to allocate bandwidth in a multiplexed data stream among payload channels 34 for broadcast or distribution.

Figure 3:
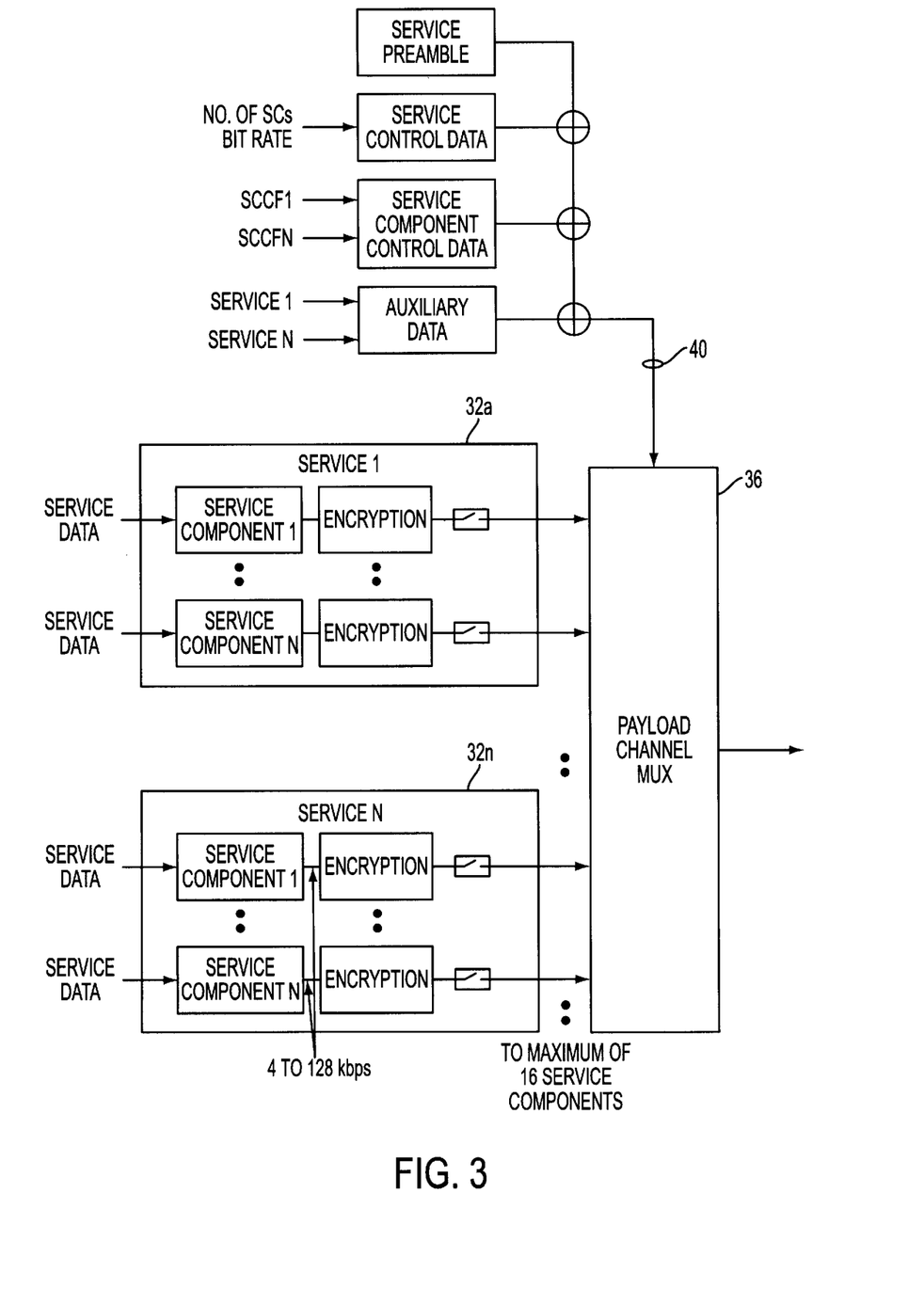
FIG. 3 is a block diagram depicting the conversion of input information into a payload channel in accordance with an embodiment of the present invention.
Figure 4:
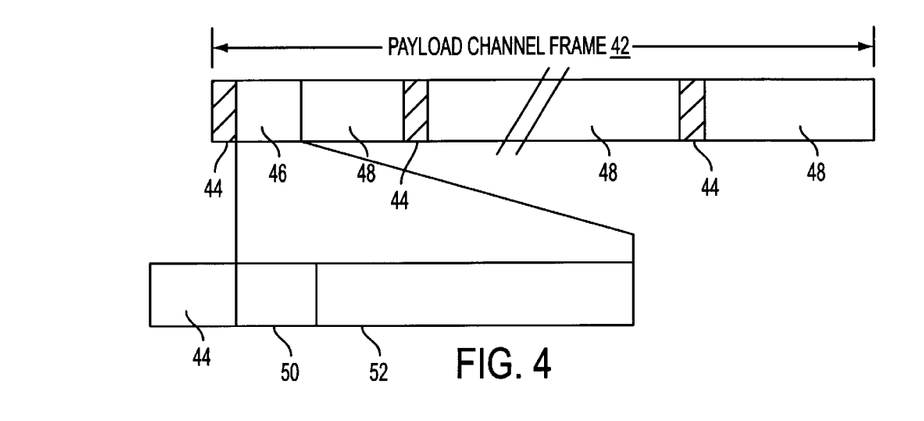
FIG. 4 illustrates a payload channel frame in accordance with an embodiment of the present invention.

With reference to FIG. 3, a payload channel 34 is assembled using a payload channel multiplexer (MUX) 36. Inputs to the MUX 36 preferably comprise the service components 38a, . . . ,38n of each service 32a, . . . ,32n designated by the programming center 20 for transmission via that particular payload channel 34. In addition, the MUX 36 receives preambles and other control information, as indicated at 40. A payload channel bit stream is preferably organized as frames of a predetermined duration. As shown in FIG. 4, each payload channel frame 42 is preferably a time multiplex of preambles 44, a service control header (SCH) 46, and data 48 from service components 38. The preambles 44 are preferably 8 bits and repeated every selected number of bits throughout a payload channel frame 42. The SCH comprises bits indicated at 50 which are combined with a preamble 44 to demarcate the beginning of the payload channel frame 42.

The remaining portion 52 of the SCH in FIG. 4 comprises data 45 such as the following data: frame identification number or frame ID, the number of service components 38 in the frame, a service component control field (SCCF) for each service component 38 contributing data 48 in the frame 42 and an auxiliary data field. The auxiliary data field can be used for various purposes such as for providing a dynamic label to be displayed at the receiver 14 or other playback device, or for control information related to a service 32 or service component 38 (i.e., narrowcast control). The SCCFs can be used, for example, to dynamically change the bit rates of service components in a payload channel and therefore to dynamically increase or decrease the overall service rate in a payload channel.

With continued reference to FIG. 2, the generation of payload channels, as described above in connection with FIGS. 3 and 4, is one of a class of functions performed by the programming center 20 which are hereinafter collectively referred to as the service layer 54. In addition to generating payload channels 34, the programming center 20 multiplexes messages in a broadcast information channel (BIC) 56 in the service layer. The BIC 56 includes auxiliary information useful for services selection and non-real-time control. For example, the BIC 56 can be used control a receiver 14 to switch to a selected channel to receive emergency information. The BIC 56 can also be used to define the relationship of a display channel (e.g., a channel number to be displayed at a receiver 14 or other playback device) to the location of the corresponding program in the composite data stream. The BIC 56 can also be used to display the station name of available services, a directory to the contents of the composite data stream, as well as the artist name, song title and program type of the services available in the composite data stream.

In accordance the present invention, the programming center 20 generates a composite data stream, which comprises a multiplex of payload channels and information for demultiplexing the payload channels, using a number of operations that are collectively referred to as the transport layer 58 in FIG. 2. The transport layer will now be described with reference to FIG. 5. Each payload channel 34 comprising a series of frames 42 is preferably divided into prime rate channels (PRCs) 60, as indicated at 64. Each PRC 60 comprises a selected number of bits. The programming center 20 uses PRCs 60 from different payload channels 34 to generate a composite data stream 66. The number of PRCs provided to the data stream 66 depends on the desired bit rate of the service to which the PRCs belong.

Figure 5:
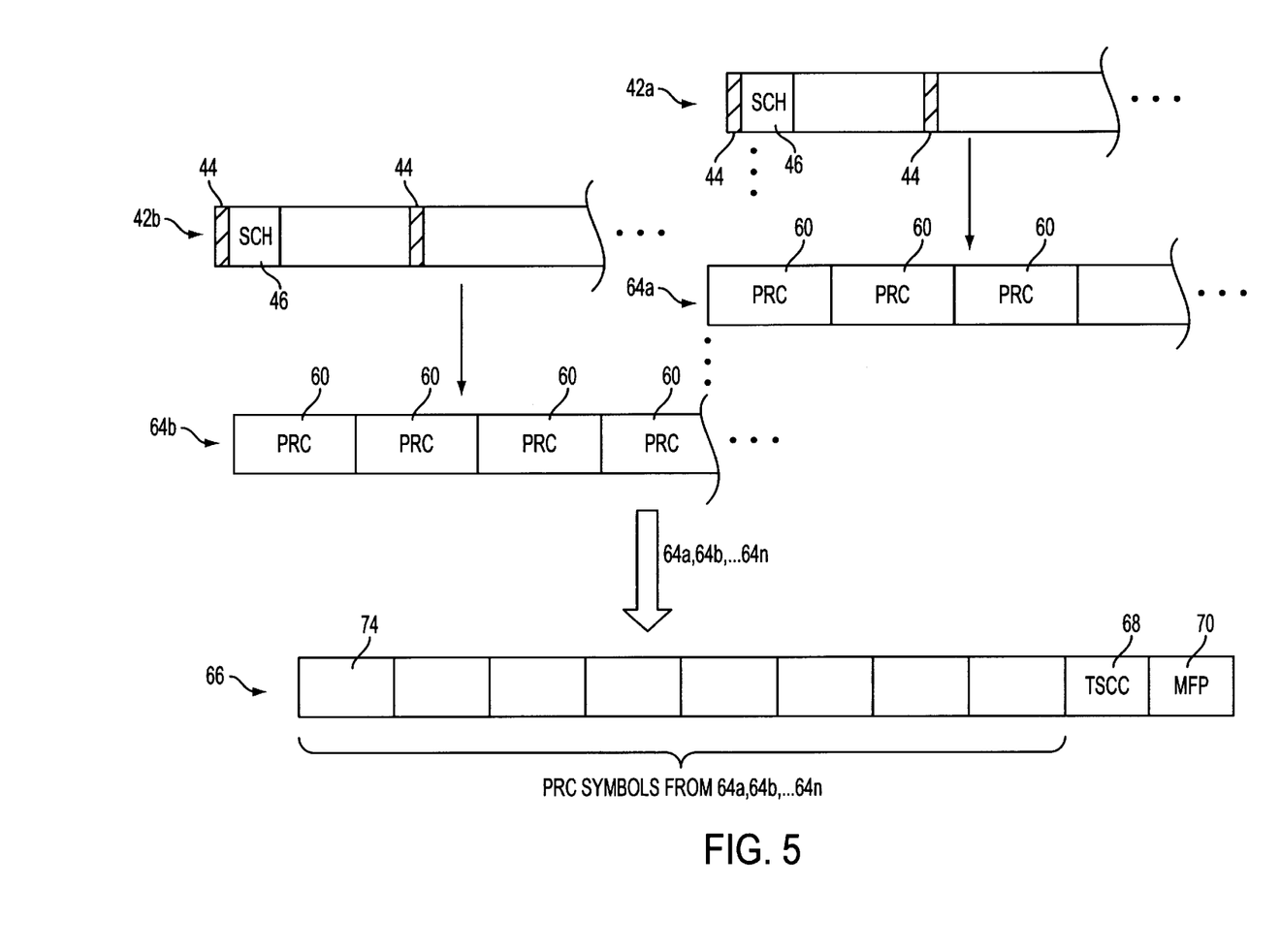
FIG. 5 illustrates assembly of an exemplary composite data stream in accordance with an embodiment of the present invention.

With continued reference to FIG. 5, the payload channels 34 are so named since they are broadcast via satellite in the illustrated embodiment. It is to be understood that the payload channels can be distributed by other methods such as other signal transmission methods and, as described below in accordance with the present invention, via the distribution of storage media having payload channels 34 stored thereon or a multi-point network. In accordance with a preferred embodiment of the present invention, the composite data stream 66 is a time division multiplexed (TDM) ensemble comprising parts of different payload channels 34 (e.g., PRCs 60 or PRC symbols), as indicated at 62, arranged in time slots 74, a time slot control channel (TSCC) 68, and a master frame preamble (MFP) 70. As will be described below, the TSCC 68 is useful to demultiplex the PRCs 60 to their respective payload channels 34 at a satellite receiver 14, or at a playback device (FIG. 7) configured in accordance with the present invention to extract and playback selected information from a composite data stream 66 stored on a storage medium 72, as shown in FIG. 2. It is to be understood, however, that PRCs 60 from different payload channels 34 can be multiplexed using different techniques such as frequency division multiplexing.

The MFP 70 in the composite signal 66 allows for synchronization at the receiver 14. The TSCC 68 comprises TDM structure information (e.g., a payload channel-to-PRC-to-time slot assignment table) to indicate which time slots 74 in the composite signal 66 comprise symbols from which PRCs 60 and from which payload channels 34. The TDM structure information can be arranged in the TSCC as a number of time slot control words (TSCWs) corresponding to each PRC in the composite data stream 66. Each TSCW can consist of a selected number of bits to provide such data as a broadcast channel identification number (BCID), which identifies the location of a payload channel in the composite data stream 66. The TSCC can also comprises time and date fields and the BIC 56 described above.

With continued reference to FIGS. 2 and 5, the transport layer 58 can also employ additional processing of the TDM data stream such as inner forward error correction (FEC) encoding (e.g., convolutional encoding and puncturing) and interleaving. The physical layers 76 in FIG. 2 for the satellite and terrestrial signals comprises programming center 20 functions such as modulating the composite data stream (e.g., QPSK modulation) and otherwise preparing the data stream for signal transmission.

In accordance with an embodiment of the present invention, a recording device 80 is provided at the programming center 20 which is programmable via its processor 82 to store a selected portion of the composite data stream 66 in a memory device 72. The stored composite data stream 66 can then be used by playback devices that are not necessarily equipped to receive a satellite or terrestrial broadcast. The recording device 80 can be any device capable of recording a digital data stream onto a device memory 72 such as a compact disc read and write device (CD-RW) or a digital audio tape recorder. The recorder 80 can be implemented on a programmed general purpose computer, special purpose computer, a programmed microprocessor or microcontroller and peripheral integrated Circuit elements, an application specific integrated circuit (ASIC) or other integrated circuit, a digital signal processor, and the like. The memory device 72 can be any memory device that can store information in a digital format, and can include a floppy disk, a hard disk, a compact disc (CD), a digital video disc (DVD), an optical disc, RAM, ROM, a disk pack, digital audio tape, or any other medium for the storage and retrieval of digital information.

Figures 6, 7:
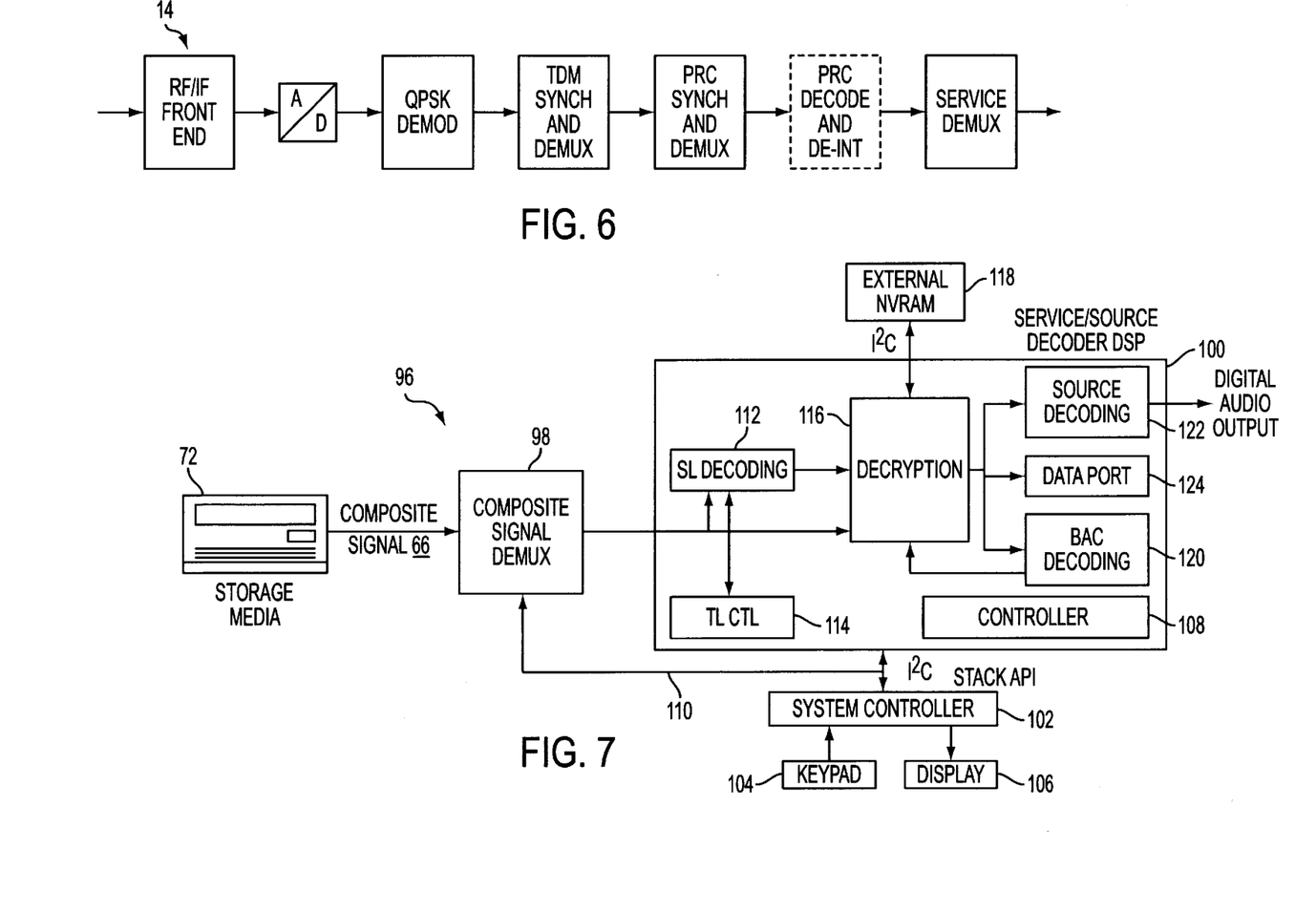
FIG. 6 illustrates demultiplexing, decoding and playback of selected content in a composite data stream at a satellite receiver segment in accordance with an embodiment of the present invention.
FIG. 7 is a block diagram depicting the demultiplexing, decoding and playback of selected content in a composite data stream stored on a storage media in response to selection of a single channel or content segment in accordance with an embodiment of the present invention.

An exemplary receiver 14 is depicted in FIG. 6. The processing will be described to allow comparison thereof with a playback device that is not equipped to receive satellite or terrestrial signals. The receiver 14 comprises radio frequency/intermediate frequency or RF/IF components 84 to receive a satellite or terrestrial broadcast. The received signal is then demodulated (e.g., QPSK demodulation), as indicated at 86. A TDM synchronization and demultiplexer device 88 locates PRCs 60 in the respective time slots 74 of the composite signal 66 using the TSCC. PRCs of the respective payload channels 34 in the composite data stream 66 are then demultiplexed, as indicated at 90. FEC decoding and de-interleaving can then be performed, as indicated at 92, if FEC and interleaving were employed by the programming center 20. Finally, a particular payload channel or service component is decoded in response to a user selection, as indicated at 94.

When the composite data stream is available via a storage medium 72, a receiver having an RF/IF front end 84 and a demodulation device 86 is not necessary, instead a playback device for a stored a composite data stream can be used such as the exemplary playback device 96 depicted in FIG. 7. The playback device has an input with which to retrieve data from the storage media 72. The input is configured to accommodate the type of memory device 72 that is used. The input can be an optical disc drawer or tape carousel for receiving, respectively, a CD or DAT having a composite data stream 66 stored thereon, and include corresponding laser circuitry or tape heads to read the stored data stream therefrom.

With continued reference to FIG. 7, the playback device 96 comprises a composite data stream demultiplexer 98 which employs the MFP 70 and the TSCC 68 to demultiplex the PRC symbols in the stored data stream 66 to their respective payload channels 34. A service/source decoder digital signal processor (DSP) 100 is provided to decode the demultipexed payload channels 34 to extract and playback selected services therein in response to user inputs, for example. A system controller 102 can receive user inputs via an input device such as a keyboard or keypad 104. The system controller 102 can be programmed in accordance with an application program interface (API) to provide users with one or more screens or messages on a display device 106 (e.g., an LCD or CRT monitor) to guide users when making selections regarding which channels and programs to retrieve from the stored data stream for playback purposes. For example, the display device 106 can provide a directory to all of the channels which is provided by the BIC 56 in the composite data stream 66. The display device 106 can also provide the user with the number of the channel that is currently being played back, the type of program or service provided by that channel, artist and song title, among other information.

In response to user inputs, the system controller 102 communicates with a controller 108 in the decoder DSP 100 and the demultiplexer 98 via a serial bus 110, for example, to indicate which service is desired. A service layer decoder 112 in the decoder DSP 100 uses transport layer information (e.g., TSCC), as indicated at 114 in the decoder DSP 100, as well as the demultiplexer 98, to locate the PRCs 60 corresponding to the payload channel 34 that provides the service selected by the user. The selected paylaod channel can then be decrypted, as indicated at 116 and 118. A broadcast authorization channel decoder 120 is provided which can be used in the system 10 to prevent unauthorized use of the composite data stream 66. It is to be understood, however, that encryption of any payload channel is optional. The selected service components are then source decoded, as indicated at 122, and any auxiliary data can be provided to a data port 124 for display on the display device 106, for example. Audio signals from the source decoding device 122 can be provided to a loudspeaker.

Figure 8:
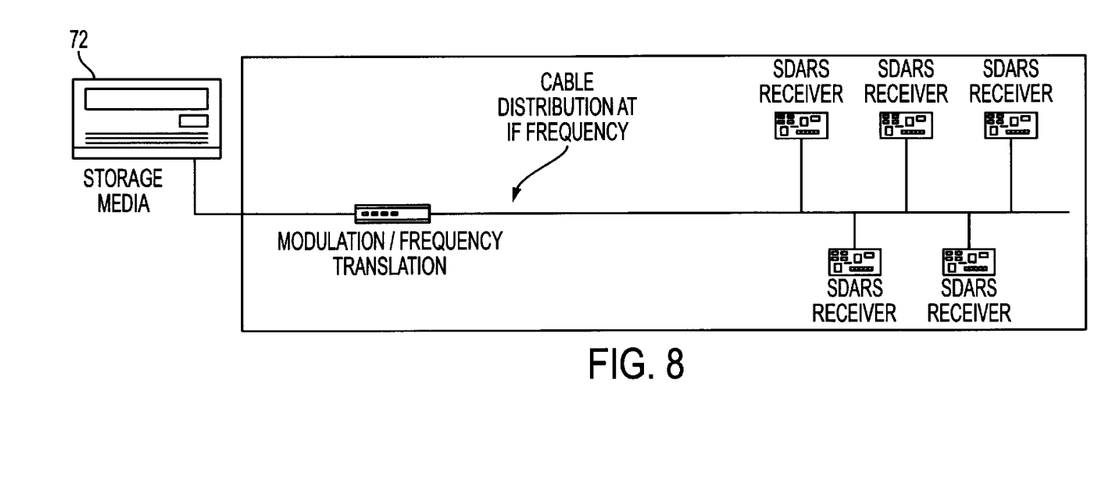
FIG. 8 is a diagram illustrating a multi-point distribution system for playback of a composite data stream on a storage medium in accordance with an embodiment of the present invention.

The playback device can be configured, for example, as a boom box with loudspeakers, or in a audio/video component chassis for user with an auxiliary input on a stereo tuner/receiver. In addition to a playback device 96, the memory device 72 having the stored composite data stream 66 can be used in a multi-point network, as shown in FIG. 8. This type of network is useful in an airplane or apartment complex where satellite or terrestrial signal reception is impaired. The multi-point network is described in the above-referenced co-pending U.S. patent application Ser. No. 09/435,315 incorporated by reference herein.

While advantageous embodiments have been chosen to illustrate the invention, it will be understood by those skilled in the art that various changes and modifications can be made therein without departing from the scope of the invention as defined in the appended claims.

What is claimed is:

1. A method of using a composite data stream, the method comprising the steps of:

obtaining a data storage medium having a portion of a composite data stream stored thereon, said composite data stream comprising a plurality of programs, said programs supporting services selected from the group consisting of audio, video and data information and providing different categories of information, said programs being divided into a plurality of program channels that are multiplexed at least in part with other said program channels to intersperse said categories of information within said composite data stream, said data storage medium allowing playback of any of said program channels for a selected period of time, said programs being selected by a provider prior to a user request and communicated to a user; and operating a playback device for said composite data stream, said composite data stream comprising control data for demultiplexing said composite data stream to allow extraction of a selected one of said categories therefrom, said playback device being programmable to receive a user input, and to process said control data in response to said user input by locally accessing said composite data stream on said local data storage medium to demultiplex and playback the selected one of said categories requested via said user input using said control data.

2. A method as claimed in claim 1, wherein said control data comprises program channel information to identify the types of said categories of information provided by said composite data stream, and further comprising the steps of:

generating a user indication using said program channel information and said playback device to allow a user to determine which one of said categories stored on said local data storage medium to playback;

receiving a selection signal indicating which one of said categories has been selected by said user; and demultiplexing at least one of said services corresponding to the selected one of said categories from said composite data signal that is indicated in said selection signal.

3. A playback device for a composite data stream, the playback device comprising:

an access device operable to access a local storage medium having a composite data stream stored thereon, said composite data stream comprising a plurality of programs and program data, said plurality of programs providing respective categories of information and being divided into program channels that are multiplexed with said program channels of other said programs to intersperse said categories of information within said composite data stream, said program data being used to demultiplex said program channels to their corresponding said programs, said programs being selected by a provider prior to a user request and communicated to a user via said local storage device, said local storage device having a portion of said composite data stream stored thereon to allow playback of any of said programs for a selected period of time;

a processing device connected to said access device;

a user input device connected to said processing device for indicating a selected one of said categories to be played back from said composite data signal, said processing device generating control signals in response to said user input device, said access device being operable to access said local storage device and retrieve selected said program channels therefrom in response to said control signals; and an output device to playback said selected one of said categories of information.

4. A playback device as claimed in claim 3, wherein said access device comprises a composite signal demultiplexer operable to receive said control signals from said processing device, and being operable in response to said control signals to demultiplex said program channels corresponding to said selected one of said categories of information from said storage device.

5. A playback device as claimed in claim 4, wherein said composite data stream comprises program identification data to identify different types of said categories of information, said processing device being operable to use said program identification data to generate an indication via said display device of different options from which a user can select one of said categories of information for demultiplexing and playback by said access device and said output device, respectively.

6. A playback device as claimed in claim 3, wherein said playback device comprises a display device for displaying data relating to the types of said categories of information that are stored on said storage device.

7. A computer-readable data structure stored in a computer-readable medium, the data structure comprising a composite data stream having a plurality of time division multiplexed program channels corresponding to a plurality of programs, said plurality of programs providing different categories of information and being interspersed in said composite data stream, each of said program channels comprising one or more service components, said service components being generated by encoding at least one of analog and digital content, said composite data stream being provided with control information to identify the location of said program channels corresponding to each of said categories of information in said composite data stream, said control information being useful to demultiplex each of said plurality of programs from said composite data stream stored on said computer-readable medium, said programs being selected by a provider prior to a user request and communicated to a user via a computer-readable medium, said computer-readable medium using said control information to locally access and playback any of said categories of information for a selected period of time in response to user selection of the corresponding said program.

* * * * *